3,095,912
SCREW DRIVER FOR BENDING WIRE
Melvin Sullivan, 523 Peach Tree Lane, Arcadia, Calif.
Filed Aug. 28, 1958, Ser. No. 757,805
2 Claims. (Cl. 140—124)

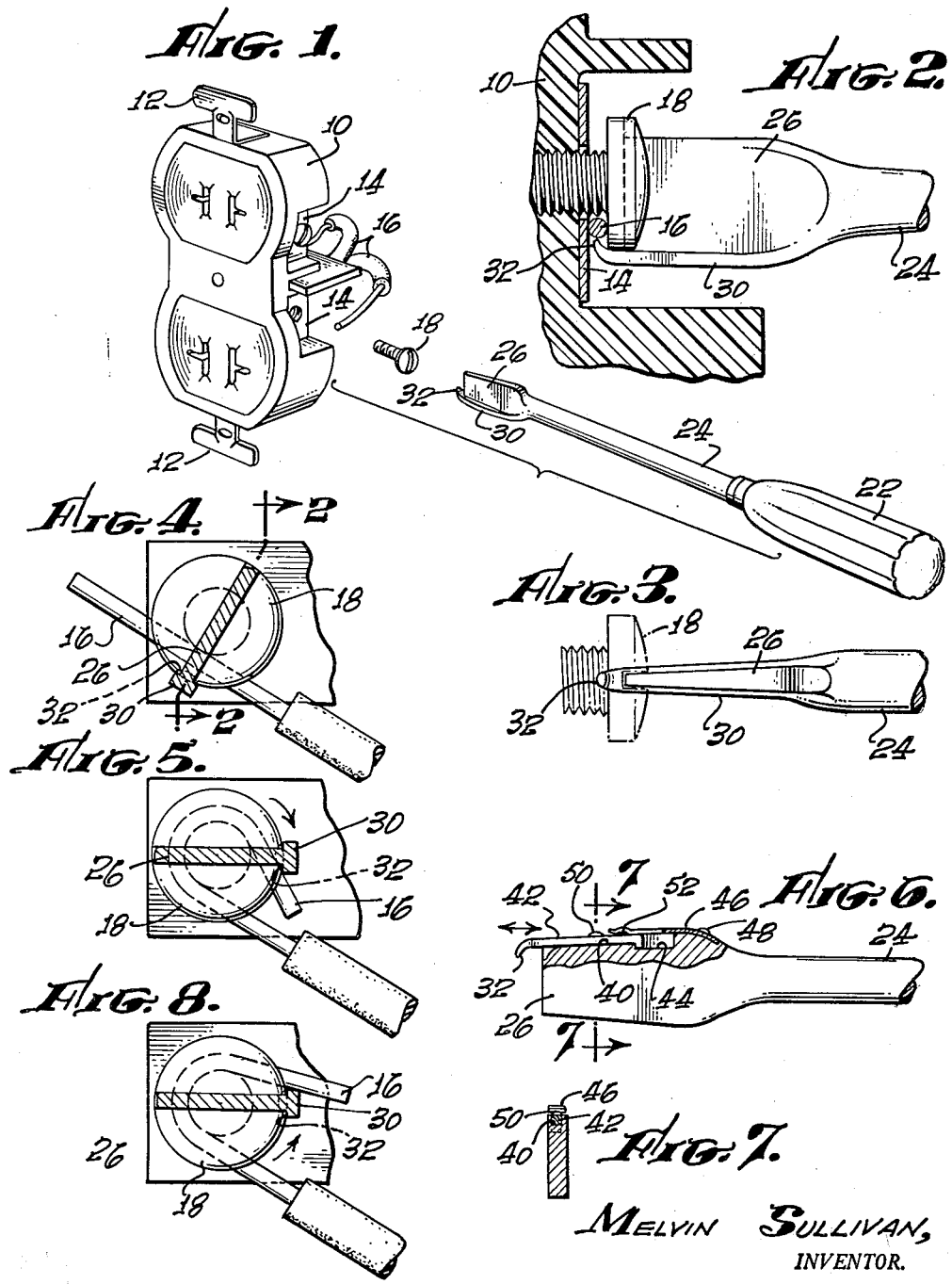

This invention relates generally to an improved tool for looping or bending wire under screw heads or the like; more particularly, it relates to a screw driver having a projection or tang for engaging and bending wire under a screw head or the like, and for unbending wire to disconnect it from a screw head.

The tool or screw driver of the present invention comprises a projection or tang which extends beyond the end of a screw driver blade at one edge thereof. The tang extends inwardly from the blade edge and is adapted to engage a wire and to bend or wrap the wire under the head of a screw being turned by the screw driver blade. The wire is thus looped in place under the head of the screw while the screw is being turned. In a preferred form of this invention, the tang or extending projection is formed integrally with a novel flange extending along one edge of the screw driver blade. The flange serves to retain the screw driver blade in engagement with the slot in the screw driver head, thereby assisting in the prevention of disengagement of the blade during turning. The flange also maintains the tang in position for bending the wire under the head of the screw and for wrapping the wire about the screw shank. After the wire is looped under the screw head, it may be more convenient to utilize a conventional screw driver for the final tightening of the screw, because the tang of the screw driver of the present invention must be disengaged from the screw after each tightening revolution in order that the tang may clear the wire.

A modified form of the present invention utilizes a retractable tang or projection which is formed as part of a slidable element which is attached to an edge of the screw driver by means of a resilient spring. The element is thus slidable along the edge of the screw driver blade so that the tang is movable outwardly and along the blade. The tang is therefore retractable so that the screw driver may be used for final tightening of a screw after wire is looped under a screw head.

It is therefore an object of the present invention to provide a novel tool for engaging and bending wire under a screw head or the like.

An object of this invention is the provision of a wire wrapping screw driver which is of simple and economical construction, and which is simple and efficient in use.

It is an object of this invention to provide a tool which facilitates the making of electrical connections, particularly connections in relatively inaccessible locations wherein great difficulty is presented in utilizing conventional means for looping or bending a wire under the head of an attaching screw while the screw is being set.

An object of the present invention is the provision of a tool which effects substantial reduction in the time, annoyance and inconvenience required in the making of electrical wiring connections.

An object of the present invention is the provision of a tool which facilitates the removal of a looped wire from an attaching screw.

An object of this invention is to provide a novel screw driver having a projecting tang adapted to engage a wire for bending or looping the wire under a screw head or for removing a wire from a screw.

An object of the present invention is the provision of a screw setting tool having a wire-engaging tang which is extensible beyond the blade of the screw driver and which is retractable.

Other objects and features of the present invention, as well as many advantages thereof, will become apparent to those skilled in the art from a consideration of the following description, the appended claims and the accompanying drawings, in which:

FIGURE 1 is an exploded perspective view showing a conventional electrical outlet receptacle, electrical wires, a terminal screw and a tool according to the present invention;

FIGURE 2 is a view of a portion of the tool of this invention positioned in the slot of an electrical terminal screw;

FIGURE 3 is a plan view of the tool of FIGURE 2 showing the cooperating screw head in phantom outline;

FIGURE 4 is a view through the end of the tool of FIGURE 2, FIGURE 2 being taken along line 2—2 of FIGURE 4;

FIGURE 5 is a view similar to the view of FIGURE 4, showing the bending of the wire under the head of the screw by the tool of the present invention;

FIGURE 6 is an elevational view of a modified form of the present invention;

FIGURE 7 is a sectional view taken at line 7—7 of FIGURE 6; and

FIGURE 8 is a view similar to the view of FIGURE 5, showing the operation of the tool in unwrapping a wire from under the head of a screw.

Referring to the drawing, and particularly to FIGURES 1, 2, 5 and 8, there is shown a preferred embodiment of the tool of the present invention. A conventional electrical outlet receptable 10, which is adapted to receive electrical plugs having extending prongs, is provided with mounting bracket 12 and electrical contact plates 14, to which wires 16 are attachable by screws 18. The end portions of the wires are stripped of insulation so that electrical connections may be provided by wrapping the end portions around the shanks of attaching screws in a manner well known in the art.

The exemplified embodiment of the present invention comprises a screw driver having a handle 22, a shank 24 and a blade 26. Along one edge of the blade and formed integrally therewith is a transverse flange or keeper 30, the tapered end of which is formed into a tang or projection 32 extending beyond the edge of the blade 26. The tang 32 has a curved portion which extends inwardly under the head of a screw being set, as shown in FIGURES 2 and 3, and which therefore projects under the head of the screw. The tang 32 is therefore positioned to engage the wire 16 underneath the head of the screw, as shown in FIGURE 2, when the blade 26 is in engagement with the slot of the screw.

In the operation of the screw driver of the present invention, the wire 16 is first positioned under the head of the screw. The screw driver blade is positioned in the slot of the screw and the tang 32 is positioned in engagement with the wire, as shown in FIGURES 2 and 4. On turning the screw driver, the tang 32 bends the wire and urges it under the screw head. The wire is thus looped around the screw shank, in the manner illustrated in FIGURE 5. The flange 30 assists in retaining the screw driver blade in position in the screw slot during turning by engaging the periphery of the screw head. Thus, the tang can continuously urge the wire under the screw head during turning.

The advantages of the invention, particularly when it is utilized for making electrical connections in relatively inaccessible locations, will be readily apparent to those skilled in the art. The difficulty, annoyance and time involved in attempting to manually wrap a wire around a shank of a screw are avoided. Firm and positive electrical connections can conveniently and quickly be provided with a high degree of speed and dexterity.

After the wire looping operation is completed and the wire secured under the head of the screw, it may be found desirable to complete the tightening or setting of the screw by using a conventional screw driver. However, the screw can be tightened by the tool of this invention by withdrawing the blade from engagement with the screw during each revolution of the screw driver, in order to permit the tang to clear the wire. In FIGURE 8 there is illustrated the operation of the tool of this invention in unbending a wire from under the head of a screw during the turning of the screw. The tang is positioned relative to the wire so that as the screw is loosened the wire is bent or unwrapped, so that the wire can be removed without removing the screw from the electrical assembly. The advantage and utility of the tool of the present invention in this operation will readily be appreciated by those versed in the art. The wire is readily removed from the screw by the simple turning of the screw to loosen it.

In FIGURES 6 and 7, there is shown a modified form of the tool of the present invention. This form permits the complete setting or tightening of the attaching screw, and the bending of the wire under the head of the screw, without requiring the use of a conventional screw driver or the removal of the tool of this invention from the screw upon each revolution of the screw driver. The screw driver blade 26 has a slot 40 formed in one side in which is slidably received an element or member 42. Element 42 has the tang 32 formed at its end. The slot 40 has a deep portion 44 at the end thereof remote from tang 32. Element 42 has an inwardly extending projection which is received in the deep portion 44 of the slot, as shown in FIGURE 6. Element 42 is normally held in position against blade 26 by a resilient spring 46 which is attached to the edge of the blade by a rivet 48 at one end, as shown. The spring 46 has an embossment adapted to fit closely over either of two buttons or knobs 50 and 52 on element 42. In the position shown, spring 46 engages knob 52 and retains element 42 in position for bending wire during the setting of a screw. For final tightening of a screw, element 42 is retractable or slidable towards the handle of the screw driver, the projection on element 42 moving in the deep slot portion 44 until spring 46 engages knob 50. As the screw head, for example screw head 18 in FIGURE 2, is drawn close to its set position, as shown in FIGURE 2, the element 42 is forced along the blade by the axial force of the screw driver. The tang 32 is forced outwardly against the urging of spring 46 to allow it to clear the screw head. Element 42 may be manually returned to the extended position shown in FIGURE 6.

From the foregoing, those skilled in the art will observe that the modified form of the present invention shown in FIGURES 6 and 7 is adapted for conveniently tightening a terminal screw while bending a wire under the head of the screw, thus completing a firm positive connection with the wire fully looped about the shank of the screw. A conventional screw driver need not be used for final tightening. The making of electrical connections is therefore further facilitated and simplified, and the annoyance of attempting to manually bend a connecting wire under the head of an attaching screw in difficult or inaccessible places is obviated.

Although specific embodiments of the present invention have been described and illustrated in detail, it is to be clearly understood that the same are by way of illustration and example only; it is to be understood that the invention is not to be limited thereto, as many variations will be readily apparent to those versed in the art and the invention is to be given its broadest possible interpretation within the scope of the appended claims.

The inventor claims:

1. A tool for setting an electrical screw having a head and for looping an electrical wire around the shank of the screw and under said head thereof, said tool comprising a blade for engaging a screw head, and a tang projecting from an edge of said blade, said tank having an inwardly extending end portion to extend under the head of the screw when the screw is engaged by said blade with the tang engaging the periphery of the screw head, said tang end portion being of such conformation and extent as to engage an electrical wire which is directly under said screw head to force it substantially against the shank of the screw whereby the tool is operative to loop the wire around the shank of the screw in a position underneath the head of the screw while the screw is turned by the tool.

2. A tool for setting a screw and bending a wire under the head of the screw during setting thereof, said tool comprising a shank having a blade, an element movably attached to an edge portion of the blade, a tang on said element, said tang extending beyond the end of the blade when said element is extended and having an end portion configurated to extend inwardly underneath the head of a screw when the blade is in engagement therewith, said end portion of the tang being of such extent as to be operative to urge a wire which is directly under the head of the screw substantially against the shank of the screw, means defining a slot in said edge portion of the blade for receiving said movable element, and spring means yieldably retaining said element in position, said element being laterally movable against the urging of said spring to permit retraction of said tang along said side edge whereby said element is slidable along said blade edge to permit extension of the tang to a position beyond the end of the blade and to permit retraction of the tang from said position, whereby the tool is operative to bend the wire circularly around the shank and under the head of the screw and then to fully set the screw by retracting said element to remove the tang from beneath the head of the screw.

References Cited in the file of this patent

UNITED STATES PATENTS

| | | |
|---|---|---|
| 789,941 | Sibley | May 16, 1905 |
| 2,430,119 | Frank | Nov. 4, 1947 |
| 2,546,489 | Wright | Mar. 27, 1951 |